UNITED STATES PATENT OFFICE.

WILLIAM PITT CLOTWORTHY, OF BALTIMORE, MARYLAND.

DESSERT-FOOD COMPOUND.

SPECIFICATION forming part of Letters Patent No. 405,013, dated June 11, 1889.

Application filed March 30, 1889. Serial No. 305,406. (No specimens.)

*To all whom it may concern:*

Be it known that I, WILLIAM PITT CLOTWORTHY, a citizen of the United States, residing at the city of Baltimore, in the State of Maryland, have invented a new and useful Composition of Matter for Culinary Purposes in that branch of the art known as "Desserts;" and I do hereby declare that the following is a full, clear, and exact description of my invention, which will enable others skilled in the art to which it appertains to compound and use the same.

My preparation or composition is nutritious and easily digested, and is appetizing for invalids and children. The flavor is very delicate, yet decided. It can be prepared for the table in a few minutes. No similar preparation combining all these desirable qualities has ever before been prepared for public use. One of the constituent elements of my said preparation is that termed "vanillin," in the United States Patent No. 192,542, granted to Ferdinand Tiemann, of Berlin, Germany, and dated June 26, 1877; or that termed "artificial vanillin," in the United States Patent No. 151,119, granted to Wilhelm Haarman, of Berlin, Prussia, and dated May 19, 1874, said patented substances being substantially the same. By my use of this article I obtain to a higher degree the delicate flavor of vanilla than can be obtained from the use of the vanilla bean or any extract of it.

My composition consists of the following ingredients, combined in the proportions stated, viz: one ounce of vanillin rubbed up with twenty-five pounds of powdered sugar. Of the mixture of these take thirty-five pounds and mix intimately with two hundred and twenty-five pounds of powdered corn-starch or starch made from wheat, rice, or potatoes. To each pound of powdered starch so prepared I use two grains of carmine to give the preparation a slightly-red color; but the color is only a matter of appearance and can be omitted.

To prepare the above-described composition for use, take three table-spoonfuls of the powder, same quantity of sugar, and mix with one quart of sweet milk. Put the mixture on a gentle fire and stir until it thickens, and continue the stirring and boiling for three minutes after it thickens, then set aside to cool. Serve with cream.

What I claim, and desire to secure by Letters Patent of the United States, is—

The herein-described nutritious, easily-digested, and palatable food compound or mixture in dry and powdered form, to be used for culinary purposes as a dessert, consisting of vanillin, powdered sugar, and powdered starch, in about the proportions specified.

WILLIAM PITT CLOTWORTHY.

Witnesses:
 GEO. W. BELL,
 WM. W. YOUNG.